(12) United States Patent
Ding et al.

(10) Patent No.: US 11,902,907 B2
(45) Date of Patent: Feb. 13, 2024

(54) IN-DEVICE COEXISTENCE IDC INDICATION MESSAGE SENDING METHOD AND DEVICE

(71) Applicant: Huawei Technologies Co., Ltd., Shenzhen (CN)

(72) Inventors: Rentian Ding, Shanghai (CN); Yiru Kuang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 377 days.

(21) Appl. No.: 17/427,480

(22) PCT Filed: Jan. 19, 2020

(86) PCT No.: PCT/CN2020/072943
§ 371 (c)(1),
(2) Date: Jul. 30, 2021

(87) PCT Pub. No.: WO2020/156270
PCT Pub. Date: Aug. 6, 2020

(65) Prior Publication Data
US 2022/0022143 A1    Jan. 20, 2022

(30) Foreign Application Priority Data
Feb. 2, 2019    (CN) .......................... 201910107615.7

(51) Int. Cl.
*H04B 7/185*    (2006.01)
*H04W 52/24*    (2009.01)
(Continued)

(52) U.S. Cl.
CPC ......... *H04W 52/243* (2013.01); *H04W 52/28* (2013.01); *H04W 52/365* (2013.01); *H04W 52/42* (2013.01)

(58) Field of Classification Search
CPC . H04W 52/243; H04W 52/28; H04W 52/365; H04W 52/42
(Continued)

(56) References Cited

U.S. PATENT DOCUMENTS

2011/0040620 A1\* 2/2011 Shkedi ............... G06Q 30/0241
705/14.66
2011/0256834 A1\* 10/2011 Dayal ................... H04W 16/14
455/67.7
(Continued)

FOREIGN PATENT DOCUMENTS

CN    102595543 A    7/2012
CN    102724671 A    10/2012
(Continued)

OTHER PUBLICATIONS

R2-1812952 (revision of R1-1810311), Huawei, et al, "In-Device Coexistence report for EN-DC," 3GPP TSG-RAN WG2 #103, Gothenburg, Sweden, XP051522536, Aug. 20-24, 2018, 16 pages.
(Continued)

*Primary Examiner* — Temica M Beamer
(74) *Attorney, Agent, or Firm* — Conley Rose, P.C.

(57) ABSTRACT

An in-device coexistence (IDC) indication message sending method includes a network device determining, when configuration information sent by the network device indicates that the terminal device can send an IDC indication message, a most proper IDC interference cancellation manner based on SUL frequency information, a type of an interfering frequency, a transmit power of the terminal device, a transmit power of the network device, a priority of a frequency band in which the interfering frequency is located, or an IDC interference cancellation manner expected by the terminal device that are indicated by the IDC indication message sent by the terminal device.

20 Claims, 4 Drawing Sheets

(51) Int. Cl.
*H04W 52/28* (2009.01)
*H04W 52/36* (2009.01)
*H04W 52/42* (2009.01)

(58) Field of Classification Search
USPC .......................................................... 370/318
See application file for complete search history.

(56) References Cited

U.S. PATENT DOCUMENTS

| | | |
|---|---|---|
| 2012/0087341 A1 | 4/2012 | Jang et al. |
| 2013/0288742 A1 | 10/2013 | Yao et al. |
| 2014/0334330 A1 | 11/2014 | Baghel et al. |
| 2015/0382257 A1 | 12/2015 | Jang et al. |
| 2016/0337904 A1* | 11/2016 | Hsu .................. H04W 28/0289 |
| 2017/0339746 A1 | 11/2017 | Ahn et al. |
| 2018/0352554 A1 | 12/2018 | Flynn et al. |
| 2021/0022146 A1 | 1/2021 | Hong |

FOREIGN PATENT DOCUMENTS

| | | |
|---|---|---|
| CN | 103155448 A | 6/2013 |
| CN | 103988536 A | 8/2014 |
| CN | 108401537 A | 8/2018 |
| CN | 109068348 A | 12/2018 |
| EP | 3282739 A1 | 2/2018 |
| EP | 2803222 B1 | 7/2018 |
| KR | 20140004561 A | 1/2014 |

OTHER PUBLICATIONS

R2-1818070 (Revision of R2-1815166), Samsung, "Discussion to support IDC indication in NR-U," 3GPP TSG-RAN WG2 #103bis , Spokane, USA, XP051557577, Nov. 12-16, 2018, 2 pages.

* cited by examiner

IN-DEVICE COEXISTENCE IDC INDICATION MESSAGE SENDING METHOD AND DEVICE

This application is a National Stage of International Patent Application No. PCT/CN2020/072943, filed on Jan. 19, 2020, which claims priority to Chinese Patent Application No. 201910107615.7, filed on Feb. 2, 2019, both of which are hereby incorporated by reference in their entireties.

TECHNICAL FIELD

This application relates to the field of wireless communications technologies, and in particular, to an in-device coexistence IDC indication message sending method and a device.

BACKGROUND

A terminal device (user equipment, UE) may have a plurality of wireless transceivers. For example, one UE may simultaneously have long term evolution (long term evolution, LTE), wireless local area network (wireless fidelity, Wi-Fi), and Bluetooth (bluetooth) transceivers, and a receiver using the global navigation satellite system (global navigation satellite system, GNSS). With development of $5^{th}$ generation mobile communications (5 generation, 5G), the terminal device may further simultaneously have a transceiver that uses a new radio (new radio, NR) access technology. For example, one UE may simultaneously support data receiving and sending by using LTE, Wi-Fi, Bluetooth, and NR, and data receiving by using the GNSS. A plurality of wireless transceivers may operate in adjacent frequency bands or harmonic frequency bands. Consequently, power interference of a UE transmitter may be far greater than receive power of information that a UE receiver actually needs to receive, that is, an in-device coexistence (causes in-device coexistence, IDC) interference problem is caused.

Currently, there are a plurality of IDC indication message sending methods for an LTE scenario and an EN-DC (E-UTRA-NR dual connectivity) scenario in which dual connectivity (Dual Connectivity, DC) is implemented between the LTE scenario and NR. However, there is no corresponding IDC indication message sending method for the NR scenario.

SUMMARY

Embodiments of this application provide an in-device coexistence IDC indication message sending method and a device, to improve data transmission performance of a terminal device by determining, by the network device by using an IDC indication message sent by a terminal device, a most appropriate IDC interference cancellation manner based on the IDC indication message sent by the terminal device.

To achieve the foregoing objectives, the following technical solutions are used in the embodiments of this application.

According to a first aspect, an embodiment of this application provides an IDC indication message sending method. The method includes: A terminal device receives configuration information sent by a network device; and if the configuration information indicates that the terminal device can send an IDC indication message, the terminal device sends the IDC indication message to the network device. The IDC indication message includes at least one of the following parameters: interfering frequency indication information, first power indication information, second power indication information, priority indication information, and manner indication information. The interfering frequency indication information is used to indicate supplementary uplink SUL frequency information or a type of an interfering frequency. The first power indication information is used to indicate a transmit power of the terminal device. The second power indication information is used to indicate a transmit power of the network device. The priority indication information is used to indicate a priority of a frequency band in which the interfering frequency is located. The manner indication information is used to indicate an IDC interference cancellation manner expected by the terminal device. Based on this solution, the terminal device can send the IDC indication message to the network device, so that the network device can determine a most proper IDC interference cancellation manner based on the IDC indication message sent by the terminal device.

With reference to the first aspect, in a first possible implementation, the interfering frequency indication information includes a measurement object MO of the interfering frequency or the SUL frequency information of the interfering frequency. Based on this solution, the IDC indication message sent by the terminal device to the network device includes the MO or the SUL frequency information of the interfering frequency, so that the network device can determine a most proper IDC interference cancellation manner based on the IDC indication message sent by the terminal device.

With reference to the first aspect and the first possible implementation of the first aspect, in a second possible implementation, if the interfering frequency indication information includes the MO of the interfering frequency, the interfering frequency indication information further includes first type indication information. The first type indication information is used to indicate the type of the interfering frequency. Based on this solution, the IDC indication message sent by the terminal device to the network device includes the MO and the first type indication information, so that the network device can determine a most proper IDC interference cancellation manner based on the IDC indication message sent by the terminal device.

With reference to the first aspect, in a third possible implementation, the first power indication information includes at least one of the following parameters: a first transmit power of the interfering frequency, a first power difference of the interfering frequency, a first interference level of the interfering frequency, and a power headroom report PHR of the interfering frequency. The first transmit power of the interfering frequency is a maximum transmit power of the terminal device, and the first power difference of the interfering frequency is a difference between a current transmit power of the terminal device and the first transmit power. Based on this solution, the IDC indication message sent by the terminal device to the network device includes at least one of the first transmit power of the interfering frequency, the first power difference of the interfering frequency, the first interference level of the interfering frequency, and the PHR of the interfering frequency, so that the terminal device can send information to the network device by using a power lower than the current transmit power, to reduce IDC interference.

With reference to the first aspect, in a fourth possible implementation, the second power indication information includes at least one of the following parameters: a second transmit power of the interfering frequency, a second power difference of the interfering frequency, and a second interference level of the interfering frequency. The second transmit power of the interfering frequency is a minimum transmit power of the network device, and the second power difference of the interfering frequency is a difference between a current transmit power of the network device and the second transmit power. Based on this solution, the IDC indication message sent by the terminal device to the network device includes at least one of the second transmit power of the interfering frequency, the second power difference of the interfering frequency, and the second interference level of the interfering frequency, so that the network device can send information to the terminal device by using a power higher than the current transmit power, to reduce IDC interference.

With reference to the first aspect, in a fifth possible implementation, the priority indication information includes second type indication information. The second type indication information is used to indicate a type of the frequency band in which the interfering frequency is located. Based on this solution, the IDC indication message sent by the terminal device to the network device includes the second type indication information, so that the network device can determine a most proper IDC interference cancellation manner based on the IDC indication message sent by the terminal device.

With reference to the first aspect, in a sixth possible implementation, the manner indication information includes first manner information or second manner information. The first manner information is used to indicate that the terminal device expects the network device not to send data temporarily, and the second manner information is used to indicate that the terminal device expects the network device to use a frequency division multiplexing manner. Based on this solution, the IDC indication message sent by the terminal device to the network device includes the first manner information or the second manner information, so that the network device can determine a most proper IDC interference cancellation manner based on the IDC indication message sent by the terminal device.

With reference to the first aspect and the foregoing possible implementations, in a seventh possible implementation, that the terminal device sends the IDC indication message to the network device further includes. The terminal device detects that IDC interference exists in a frequency band supported by the terminal device; and the terminal device sends the IDC indication message to the network device. Based on this solution, the terminal device detects that the IDC interference exists in the frequency band supported by the terminal device, and then the terminal device sends the IDC indication message to the network device, so that the network device can determine a most proper IDC interference cancellation manner based on the IDC indication message sent by the terminal device.

According to a second aspect, an embodiment of this application provides an IDC indication message sending method. The method includes: A network device sends configuration information to a terminal device; and the network device receives an IDC indication message sent by the terminal device. The IDC indication message includes at least one of the following parameters: interfering frequency indication information, first power indication information, second power indication information, priority indication information, and manner indication information. The interfering frequency indication information is used to indicate SUL frequency information or a type of an interfering frequency. The first power indication information is used to indicate a transmit power of the terminal device. The second power indication information is used to indicate a transmit power of the network device. The priority indication information is used to indicate a priority of a frequency band in which the interfering frequency is located. The manner indication information is used to indicate an IDC interference cancellation manner expected by the terminal device. Based on this solution, the network device receives the IDC indication message sent by the terminal device, so that the network device can determine a most proper IDC interference cancellation manner based on the received IDC indication message.

With reference to the second aspect, in a first possible implementation, the interfering frequency indication information includes an MO of the interfering frequency or the SUL frequency information of the interfering frequency. Based on this solution, the IDC indication message received by the network device includes the MO or the SUL frequency information of the interfering frequency, so that the network device can determine a most proper IDC interference cancellation manner based on the received IDC indication message.

With reference to the second aspect and the first possible implementation of the second aspect, in a second possible implementation, if the interfering frequency indication information includes the MO of the interfering frequency, the interfering frequency indication information further includes first type indication information. The first type indication information is used to indicate the type of the interfering frequency. Based on this solution, the IDC indication message received by the network device includes the MO and the first type indication information, so that the network device can determine a most proper IDC interference cancellation manner based on the received IDC indication message.

With reference to the second aspect, in a third possible implementation, the first power indication information includes at least one of the following parameters: a first transmit power of the interfering frequency, a first power difference of the interfering frequency, a first interference level of the interfering frequency, and a PHR of the interfering frequency. The first transmit power of the interfering frequency is a maximum transmit power of the terminal device, and the first power difference of the interfering frequency is a difference between a current transmit power of the terminal device and the first transmit power. Based on this solution, the IDC indication message received by the network device includes at least one of the first transmit power of the interfering frequency, the first power difference of the interfering frequency, the first interference level of the interfering frequency, and the PHR of the interfering frequency, so that the network device can indicate, to the terminal device based on the received IDC indication message, a power lower than the current transmit power, to reduce IDC interference.

With reference to the second aspect and the third possible implementation of the second aspect, in a fourth possible implementation, the network device indicates the maximum transmit power of the terminal device based on the first power indication information. Based on this solution, the network device can indicate the maximum transmit power of the terminal device based on the first power indication information, to cancel IDC interference.

With reference to the second aspect, in a fifth possible implementation, the second power indication information includes at least one of the following parameters: a second transmit power of the interfering frequency, a second power difference of the interfering frequency, and a second interference level of the interfering frequency. The second transmit power of the interfering frequency is a minimum transmit power of the network device, and the second power difference of the interfering frequency is a difference between a current transmit power of the network device and the second transmit power. Based on this solution, the IDC indication message received by the network device includes at least one of the second transmit power of the interfering frequency, the second power difference of the interfering frequency, and the second interference level of the interfering frequency, so that the network device can configure, for the network device based on the received IDC indication message, a power higher than the current transmit power, to reduce IDC interference.

With reference to the second aspect, in a sixth possible implementation, the priority indication information includes second type indication information. The second type indication information is used to indicate a type of the frequency band in which the interfering frequency is located. Based on this solution, the IDC indication message received by the network device includes the second type indication information, so that the network device can determine a most proper IDC interference cancellation manner based on the received IDC indication message.

With reference to the second aspect, in a seventh possible implementation, the manner indication information includes first manner information or second manner information. The first manner information is used to indicate that the terminal device expects the network device not to send data temporarily, and the second manner information is used to indicate that the terminal device expects the network device to use a frequency division multiplexing manner. Based on this solution, the IDC indication message received by the network device includes the first manner information or the second manner information, so that the network device can determine a most proper IDC interference cancellation manner based on the received IDC indication message.

With reference to the second aspect and the foregoing possible implementations, in an eighth possible implementation, the IDC indication message is sent in cases in which IDC interference exists in a frequency band supported by the terminal device, the terminal device cannot resolve the IDC interference, and the configuration information indicates that the terminal device can send the IDC indication message. Based on this solution, the network device receives the IDC indication message in the cases in which the IDC interference exists in the frequency band supported by the terminal device, the terminal device cannot resolve the IDC interference, and the configuration information indicates that the terminal device can send the IDC indication message, so that the network device can determine a most proper IDC interference cancellation manner based on the received IDC indication message.

With reference to the second aspect and the foregoing possible implementations, in a ninth possible implementation, the network device determines an IDC interference cancellation manner based on the IDC indication message. Based on this solution, the network device can determine a most proper IDC interference cancellation manner based on the received IDC indication message.

According to a third aspect, an embodiment of this application provides a terminal device. The terminal device includes a receiving module, a determining module, and a sending module. The receiving module is configured to enable the terminal device to receive configuration information sent by a network device; the determining module is configured to determine that the configuration information indicates that the terminal device can send an IDC indication message; and the sending module is configured to enable the terminal device to send the IDC indication message to the network device. The IDC indication message includes at least one of the following parameters: interfering frequency indication information, first power indication information, second power indication information, priority indication information, and manner indication information. The interfering frequency indication information is used to indicate supplementary uplink SUL frequency information or a type of an interfering frequency. The first power indication information is used to indicate a transmit power of the terminal device. The second power indication information is used to indicate a transmit power of the network device. The priority indication information is used to indicate a priority of a frequency band in which the interfering frequency is located. The manner indication information is used to indicate an IDC interference cancellation manner expected by the terminal device. Based on this solution, the terminal device can send the IDC indication message to the network device, so that the network device can determine a most proper IDC interference cancellation manner based on the IDC indication message sent by the terminal device.

With reference to the third aspect, in a first possible implementation, the interfering frequency indication information includes a measurement object MO of the interfering frequency or the SUL frequency information of the interfering frequency. Based on this solution, the IDC indication message sent by the terminal device to the network device includes the MO or the SUL frequency information of the interfering frequency, so that the network device can determine a most proper IDC interference cancellation manner based on the IDC indication message sent by the terminal device.

With reference to the third aspect and the first possible implementation of the third aspect, in a second possible implementation, if the interfering frequency indication information includes the MO of the interfering frequency, the interfering frequency indication information further includes first type indication information. The first type indication information is used to indicate the type of the interfering frequency. Based on this solution, the IDC indication message sent by the terminal device to the network device includes the MO and the first type indication information, so that the network device can determine a most proper IDC interference cancellation manner based on the IDC indication message sent by the terminal device.

With reference to the third aspect, in a third possible implementation, the first power indication information includes at least one of the following parameters: a first transmit power of the interfering frequency, a first power difference of the interfering frequency, a first interference level of the interfering frequency, and a power headroom report PHR of the interfering frequency. The first transmit power of the interfering frequency is a maximum transmit power of the terminal device, and the first power difference of the interfering frequency is a difference between a current transmit power of the terminal device and the first transmit power. Based on this solution, the IDC indication message sent by the terminal device to the network device includes at least one of the first transmit power of the interfering frequency, the first power difference of the interfering frequency, the first interference level of the interfering frequency, and the PHR of the interfering frequency, so that the terminal device can send information to the network device by using a power lower than the current transmit power, to reduce IDC interference.

With reference to the third aspect, in a fourth possible implementation, the second power indication information includes at least one of the following parameters: a second transmit power of the interfering frequency, a second power difference of the interfering frequency, and a second interference level of the interfering frequency. The second transmit power of the interfering frequency is a minimum transmit power of the network device, and the second power difference of the interfering frequency is a difference between a current transmit power of the network device and the second transmit power. Based on this solution, the IDC indication message sent by the terminal device to the network device includes at least one of the second transmit power of the interfering frequency, the second power difference of the interfering frequency, and the second interference level of the interfering frequency, so that the network device can send information to the terminal device by using a power higher than the current transmit power, to reduce IDC interference.

With reference to the third aspect, in a fifth possible implementation, the priority indication information includes second type indication information. The second type indication information is used to indicate a type of the frequency band in which the interfering frequency is located. Based on this solution, the IDC indication message sent by the terminal device to the network device includes the second type indication information, so that the network device can determine a most proper IDC interference cancellation manner based on the IDC indication message sent by the terminal device.

With reference to the third aspect, in a sixth possible implementation, the manner indication information includes first manner information or second manner information. The first manner information is used to indicate that the terminal device expects the network device not to send data temporarily, and the second manner information is used to indicate that the terminal device expects the network device to use a frequency division multiplexing manner. Based on this solution, the IDC indication message sent by the terminal device to the network device includes the first manner information or the second manner information, so that the network device can determine a most proper IDC interference cancellation manner based on the IDC indication message sent by the terminal device.

With reference to the third aspect and the foregoing possible implementations, in a seventh possible implementation, the sending module includes: The terminal device detects that IDC interference exists in a frequency band supported by the terminal device; and the terminal device sends the IDC indication message to the network device. Based on this solution, the terminal device detects that the IDC interference exists in the frequency band supported by the terminal device, and then the terminal device sends the IDC indication message to the network device, so that the network device can determine a most proper IDC interference cancellation manner based on the IDC indication message sent by the terminal device.

According to a fourth aspect, an embodiment of this application provides a network device. The network device includes a sending module and a receiving module. The sending module is configured to enable the network device to send configuration information to a terminal device; and the receiving module is configured to enable the network device to receive an IDC indication message sent by the terminal device. The IDC indication message includes at least one of the following parameters: interfering frequency indication information, first power indication information, second power indication information, priority indication information, and manner indication information. The interfering frequency indication information is used to indicate SUL frequency information or a type of an interfering frequency. The first power indication information is used to indicate a transmit power of the terminal device. The second power indication information is used to indicate a transmit power of the network device. The priority indication information is used to indicate a priority of a frequency band in which the interfering frequency is located. The manner indication information is used to indicate an IDC interference cancellation manner expected by the terminal device. Based on this solution, the network device receives the IDC indication message sent by the terminal device, so that the network device can determine a most proper IDC interference cancellation manner based on the received IDC indication message.

With reference to the fourth aspect, in a first possible implementation, the interfering frequency indication information includes an MO of the interfering frequency or the SUL frequency information of the interfering frequency. Based on this solution, the IDC indication message received by the network device includes the MO or the SUL frequency information of the interfering frequency, so that the network device can determine a most proper IDC interference cancellation manner based on the received IDC indication message.

With reference to the fourth aspect and the first possible implementation of the fourth aspect, in a second possible implementation, if the interfering frequency indication information includes the MO of the interfering frequency, the interfering frequency indication information further includes first type indication information. The first type indication information is used to indicate the type of the interfering frequency. Based on this solution, the IDC indication message received by the network device includes the MO and the first type indication information, so that the network device can determine a most proper IDC interference cancellation manner based on the received IDC indication message.

With reference to the fourth aspect, in a third possible implementation, the first power indication information includes at least one of the following parameters: a first transmit power of the interfering frequency, a first power difference of the interfering frequency, a first interference level of the interfering frequency, and a PHR of the interfering frequency. The first transmit power of the interfering frequency is a maximum transmit power of the terminal device, and the first power difference of the interfering frequency is a difference between a current transmit power of the terminal device and the first transmit power. Based on this solution, the IDC indication message received by the network device includes at least one of the first transmit power of the interfering frequency, the first power difference of the interfering frequency, the first interference level of the interfering frequency, and the PHR of the interfering frequency, so that the network device can indicate, to the terminal device based on the received IDC indication message, a power lower than the current transmit power, to reduce IDC interference.

With reference to the fourth aspect and the third possible implementation of the fourth aspect, in a fourth possible implementation, the network device indicates the maximum transmit power of the terminal device based on the first power indication information. Based on this solution, the network device can indicate the maximum transmit power of the terminal device based on the first power indication information, to cancel IDC interference.

With reference to the fourth aspect, in a fifth possible implementation, the second power indication information includes at least one of the following parameters: a second transmit power of the interfering frequency, a second power difference of the interfering frequency, and a second interference level of the interfering frequency. The second transmit power of the interfering frequency is a minimum transmit power of the network device, and the second power difference of the interfering frequency is a difference between a current transmit power of the network device and the second transmit power. Based on this solution, the IDC indication message received by the network device includes at least one of the second transmit power of the interfering frequency, the second power difference of the interfering frequency, and the second interference level of the interfering frequency, so that the network device can configure, for the network device based on the received IDC indication message, a power higher than the current transmit power, to reduce IDC interference.

With reference to the fourth aspect, in a sixth possible implementation, the priority indication information includes second type indication information. The second type indication information is used to indicate a type of the frequency band in which the interfering frequency is located. Based on this solution, the IDC indication message received by the network device includes the second type indication information, so that the network device can determine a most proper IDC interference cancellation manner based on the received IDC indication message.

With reference to the fourth aspect, in a seventh possible implementation, the manner indication information includes first manner information or second manner information. The first manner information is used to indicate that the terminal device expects the network device not to send data temporarily, and the second manner information is used to indicate that the terminal device expects the network device to use a frequency division multiplexing manner. Based on this solution, the IDC indication message received by the network device includes the first manner information or the second manner information, so that the network device can determine a most proper IDC interference cancellation manner based on the received IDC indication message.

With reference to the fourth aspect and the foregoing possible implementations, in an eighth possible implementation, the IDC indication message is sent in cases in which IDC interference exists in a frequency band supported by the terminal device, the terminal device cannot resolve the IDC interference, and the configuration information indicates that the terminal device can send the IDC indication message. Based on this solution, the network device receives the IDC indication message in the cases in which the IDC interference exists in the frequency band supported by the terminal device, the terminal device cannot resolve the IDC interference, and the configuration information indicates that the terminal device can send the IDC indication message, so that the network device can determine a most proper IDC interference cancellation manner based on the received IDC indication message.

With reference to the fourth aspect and the foregoing possible implementations, in a ninth possible implementation, the network device further includes a determining module. The determining module is configured to enable the network device to determine an IDC interference cancellation manner based on the IDC indication message. Based on this solution, the network device can determine a most proper IDC interference cancellation manner based on the received IDC indication message.

An embodiment of this application further provides a terminal device, including at least one processor, at least one memory, and a communications interface. The communications interface and the at least one memory are coupled to the at least one processor, the terminal device communicates with another device through the communications interface, and the at least one memory is configured to store a computer program, so that when the computer program is executed by the at least one processor, the IDC indication message sending method according to any one of the first aspect and the possible implements of the first aspect is implemented.

An embodiment of this application further provides a network device, including at least one processor, at least one memory, and a communications interface. The communications interface and the at least one memory are coupled to the at least one processor, the network device communicates with another device through the communications interface, and the at least one memory is configured to store a computer program, so that when the computer program is executed by the at least one processor, the IDC indication message sending method according to any one of the second aspect and the possible implements of the second aspect is implemented.

An embodiment of this application further provides a computer-readable storage medium, for example, a non-transitory computer-readable storage medium. A computer program is stored on the computer-readable storage medium. When the computer program is run on a computer, the computer is enabled to perform any possible method in the first aspect or any possible method in the second aspect. For example, the computer may be at least one storage node.

An embodiment of this application further provides a computer program product. When the computer program product is run on a computer, any method provided in the first aspect or any method provided in the second aspect is performed. For example, the computer may be at least one storage node.

It may be understood that any apparatus, computer storage medium, or computer program product provided above is configured to perform a corresponding method provided in the foregoing description. Therefore, for beneficial effects that can be achieved by the apparatus, computer storage medium, or computer program product, refer to beneficial effects of the corresponding method. Details are not described herein again.

DESCRIPTION OF EMBODIMENTS

Figure 1:
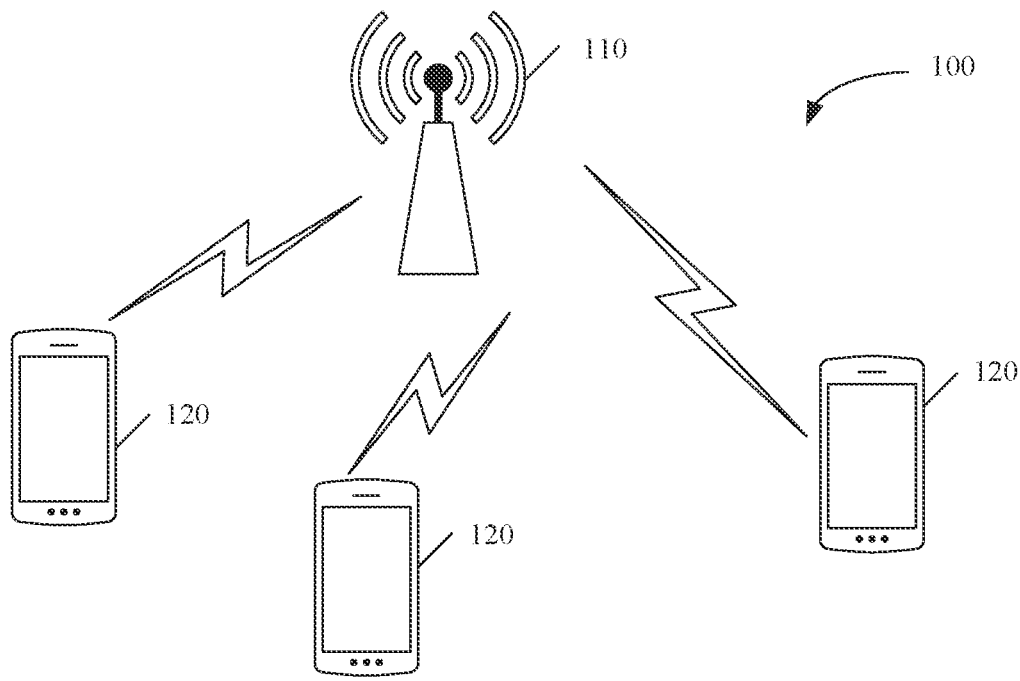
FIG. 1 is a schematic diagram of an architecture of a communications system according to an embodiment of this application.

The technical solutions provided in this application may be applied to various communications systems. The technical solutions provided in this application may be applied to a 5G communications system, a future evolved system, a plurality of communications convergence systems, or the like, or may be applied to an existing communications system or the like. FIG. 1 is a schematic diagram of an architecture of a communications system 100 according to an embodiment of this application. In FIG. 1, the communications system 100 may include one or more network devices 110 (only one network device is shown) and one or more terminal devices 120 connected to each network device 110. FIG. 1 is merely a schematic diagram, and does not constitute a limitation on a scenario to which the technical solutions provided in this application are applicable.

The network device 110 may be a network device in the 5G communications system or a network device in the future evolved network, or may be an eNB or an eNodeB (evolved NodeB) in long term evolution (long term evolution, LTE).

The terminal device 120 may be user equipment (user equipment, UE), an access terminal, a UE unit, a UE station, a mobile station, a mobile console, a remote station, a remote terminal, a mobile device, a UE terminal, a wireless communications device, a UE agent, a UE apparatus, or the like. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal in a 5G network, a terminal in a future evolved public land mobile network (public land mobile network PLMN), or the like.

Each network element (for example, the network device 110 and the terminal device 120) in FIG. 1 may be implemented by one device, or may be jointly implemented by a plurality of devices, or may be a function module in a device. This is not specifically limited in the embodiment of this application. It may be understood that the foregoing function may be a network element in a hardware device, or may be a software function running on special-purpose hardware, or may be a virtualized function instantiated on a platform (for example, a cloud platform).

To cancel IDC interference, an IDC indication message sending method is as follows: A network device sends a radio resource control (radio resource control, RRC) connection reconfiguration message to a terminal device. If the RRC connection reconfiguration message indicates that the terminal device can send an IDC indication message, the terminal device sends the IDC indication message to the network device, and the network device determines an IDC interference cancellation method based on the IDC indication message sent by the terminal device.

The IDC indication message includes at least one of the following parameters: interfering frequency indication information, interference direction indication information, interfered system type indication information, time division multiplexing manner parameter indication information, and hardware sharing problem indication information. The interfering frequency indication information is used to indicate an interfering frequency or an interfered frequency, the interference direction indication information is used to indicate an interfering frequency band or an interfered frequency band, the interfered system type indication information is used to indicate a type of an interfered system, the time division multiplexing manner parameter indication information is used to indicate parameter information when an IDC interference cancellation manner expected by the terminal device is time division multiplexing, and the hardware sharing problem indication information is used to indicate interference between a licensed spectrum and an unlicensed spectrum.

It should be noted that an access technology such as LTE, NR, or EN-DC may be collectively referred to as a cellular access technology, a frequency band in which the cellular access technology operates may be referred to as a cellular frequency band, and a frequency on which the cellular access technology operates may be referred to as a cellular frequency. An access technology such as Wi-Fi, Bluetooth, or GNSS may be collectively referred to as an industrial, scientific, and medical (Industrial. Scientific and Medical, ISM) access technology, a frequency band in which the industrial, scientific, and medical access technology operates may be referred to as an ISM frequency band, and a frequency on which the industrial, scientific, and medical access technology operates may be referred to as an ISM frequency. Therefore, the interference direction indication information may include the cellular frequency band or the ISM frequency band.

The IDC indication message sending method may be applied to an LTE scenario and an EN-DC scenario. If the IDC indication message sending method is applied to an NR scenario, the following problems may occur:

Problem 1: For an LTE network, one measurement object (measObject, MO) may correspond to one uplink frequency. Therefore, if the cellular frequency band interferes with the ISM frequency band, the network device may determine an interfering frequency namely, an uplink frequency corresponding to the MO of the interfering frequency, based on an MO of the interfering frequency reported by the terminal device. However, an NR network is additionally configured with a supplementary uplink (supplementary uplink, SUL) frequency band. In this way, for the NR network, one MO may correspond to two uplink frequencies, where one uplink frequency is a normal uplink frequency, namely, an uplink frequency in the LTE network, and the other uplink frequency is an SUL frequency. Therefore, if the cellular frequency band interferes with the ISM frequency band, the network device may determine, based on the MO of the interfering frequency reported by the terminal device, two frequencies, namely, the normal uplink frequency and the SUL frequency that correspond to the MO of the interfering frequency. If the interfering frequency is one of the normal uplink frequency and the SUL frequency, the network device cannot determine whether the interfering frequency is the normal uplink frequency or the SUL frequency.

Problem 2: To reduce interference caused by the cellular frequency band to another frequency band, a transmit power of the terminal device may be reduced, to cancel IDC interference between a plurality of access technologies. In an existing protocol, the IDC interference is not considered when a power headroom reported by a power headroom report (power headroom report, PHR) is calculated. If the terminal device considers the IDC interference when the power headroom is calculated, the following problems may occur:

A: If the power headroom reported by the PHR is a negative value, it indicates that a transmit power headroom of the terminal device is insufficient. In this way, the network device may reduce the transmit power of the terminal device, a resource block (resource block, RB) of the terminal device, or a modulation and coding scheme (modulation and coding scheme, MCS) of the terminal device. When the cellular frequency band interferes with the ISM frequency band, if the power headroom reported by the PHR is the negative value, the network device may reduce the transmit power of the terminal device, to reduce interference caused by the cellular frequency band to the ISM frequency band; however, the network device reduces the RB of the terminal device or the MCS of the terminal device, not to reduce the interference caused by the cellular frequency band to the ISM frequency band.

B. In the NR network, if a physical uplink shared channel (physical uplink shared channel, PUSCH) resource is separately configured on both a normal uplink and an SUL, the PHR may be sent with a carrier configured with a physical uplink control channel (physical uplink control channel, PUCCH) resource, downlink control information (Downlink Control Information, DCI) may dynamically indicate whether a PUSCH is sent on the normal uplink or on the SUL, and however, if the PUSCH and a PUCCH are sent on different uplinks, the network device cannot obtain a PHR of a frequency band of an uplink on which the PUSCH is located.

Problem 3: If a Wi-Fi frequency band interferes with the cellular frequency band, the network device may increase a downlink transmit power, to ensure that the terminal device can normally receive a cellular signal. However, the IDC indication message in the foregoing IDC indication message sending method does not include indication information of a transmit power of the network device.

Problem 4: The IDC interference may have a plurality of interference scenarios. For example, when the cellular frequency band interferes with the Wi-Fi frequency band, a priority of information sent by the terminal device in the cellular frequency band may be higher than a priority of information received by the terminal device in the Wi-Fi frequency band, or the priority of the information received by the terminal device in the Wi-Fi frequency band may be higher than the priority of the information sent by the terminal device in the cellular frequency band. Therefore, only based on the interference direction indication information or the interfered system type indication information, the network device cannot determine a specific interference scenario, and is more unlikely to determine the IDC interference cancellation manner.

Problem 5: Information reported in the IDC indication message is insufficient to enable the network device to determine a related parameter of information that is temporarily not received by the terminal device in the cellular frequency band.

In view of this, this application provides an IDC indication message sending method. The method may be applied to not only the LTE scenario and the EN-DC scenario, but also the NR scenario. A person skilled in the art may understand that the IDC indication message sending method provided in this application may be further applied to another scenario. This is not specifically limited in this application. The following specifically describes a hardware structure corresponding to each network element and the IDC indication message sending method in the embodiment of this application.

Figure 2:
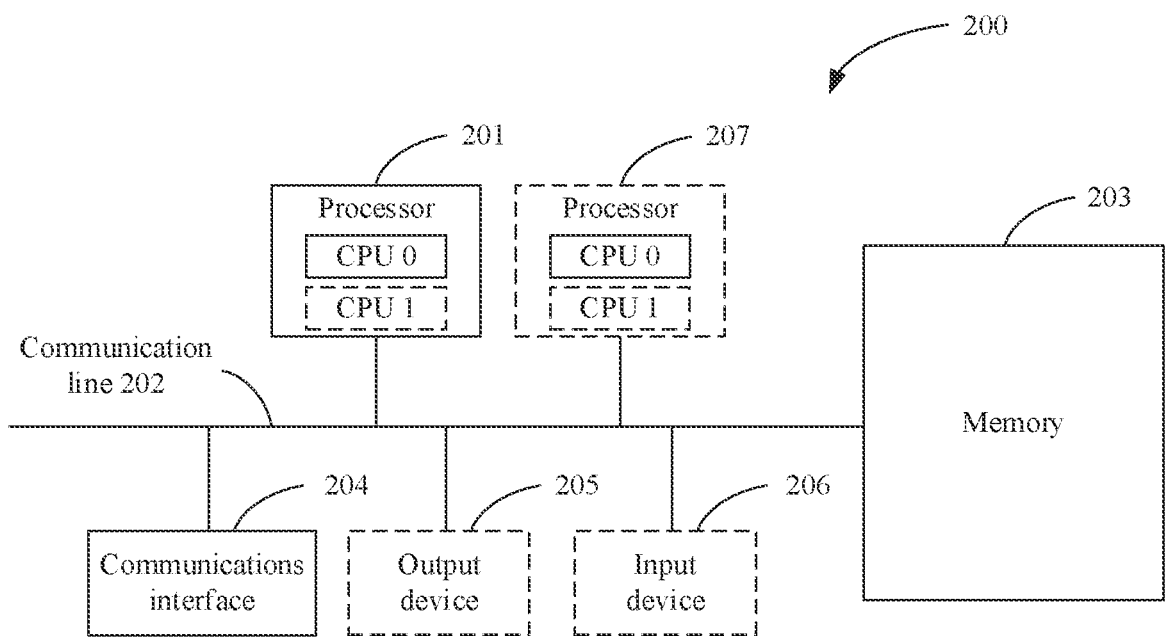
FIG. 2 is a schematic diagram of a hardware structure of a communications device according to an embodiment of this application.

Each network element in FIG. 1 may be implemented by using a communications device 200 in FIG. 2. FIG. 2 is a schematic diagram of a hardware structure of the communications device applicable to an embodiment of this application. The communications device 200 includes at least one processor 201, a communication line 202, a memory 203, and at least one communications interface 204.

The processor 201 may be a general-purpose central processing unit (central processing unit, CPU), a microprocessor, an application-specific integrated circuit (application-specific integrated circuit, ASIC), or one or more integrated circuits for controlling program execution of the solutions of this application.

The communication line 202 may include a path for transmitting information between the foregoing components.

The communications interface 204 is configured to communicate with another device or a communications network, for example, an Ethernet, a RAN, or a wireless local area network (wireless local area networks, WLAN) by using any apparatus such as a transceiver.

The memory 203 may be a read-only memory (read-only memory, ROM) or another type of static storage device that can store static information and an instruction, or a random access memory (random access memory, RAM) or another type of dynamic storage device that can store information and an instruction, or may be an electrically erasable programmable read-only memory (electrically erasable programmable read-only memory, EEPROM), a compact disc read-only memory (compact disc read-only memory, CD-ROM) or another compact disc storage, optical disc storage (including a compressed optical disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer. However, the memory 203 is not limited thereto. The memory may exist independently, and is connected to the processor through the communication line 202. Alternatively, the memory may be integrated into the processor. The memory provided in the embodiment of this application may usually be nonvolatile. The memory 203 is configured to store a computer-executable instruction for executing the solutions of this application, and the processor 201 controls the execution. The processor 201 is configured to execute the computer-executable instruction stored in the memory 203, to implement a method provided in the following embodiment of this application.

During specific implementation, the computer-executable instruction in the embodiment of this application may also be referred to as application program code. This is not specifically limited in the embodiment of this application.

During specific implementation, in an embodiment, the processor 201 may include one or more CPUs, for example, a CPU 0 and a CPU 1 in FIG. 2.

During specific implementation, in an embodiment, the communications device 200 may include a plurality of processors, for example, the processor 201 and a processor 207 in FIG. 2. Each of these processors may be a single-core (single-CPU) processor, or may be a multi-core (multi-CPU) processor. The processor herein may be one or more devices, circuits, and/or processing cores configured to process data (for example, a computer program instruction).

During specific implementation, in an embodiment, the communications device 200 may further include an output device 205 and an input device 206. The output device 205 communicates with the processor 201, and may display information in a plurality of manners. For example, the output device 205 may be a liquid crystal display (liquid crystal display. LCD), a light emitting diode (light emitting diode, LED) display device, a cathode ray tube (cathode ray tube, CRT) display device, a projector (projector), or the like. The input device 206 communicates with the processor 201, and may receive an input of a user in a plurality of manners. For example, the input device 206 may be a mouse, a keyboard, a touchscreen device, a sensing device, or the like.

The communications device 200 may be a general-purpose device or a special-purpose device. During specific implementation, the communications device 200 may be a desktop computer, a portable computer, a network server, a palmtop computer (personal digital assistant, PDA), a mobile phone, a tablet computer, a wireless terminal device, an embedded device, or a device having a structure similar to that in FIG. 2. A type of the communications device 200 is not limited in the embodiment of this application.

The following specifically describes the IDC indication message sending method provided in the embodiment of this application with reference to FIG. 1 and FIG. 2.

It should be noted that in the following embodiment of this application, names of messages between network elements, names of parameters in messages, or the like are merely examples, and there may be other names during specific implementation. This is not specifically limited in the embodiment of this application.

Figure 3:
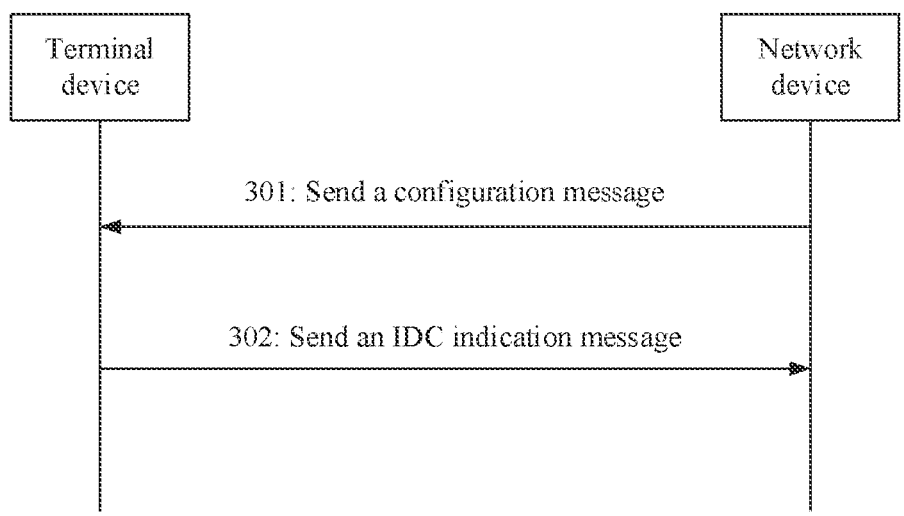
FIG. 3 is a schematic flowchart 1 of an IDC indication message sending method according to an embodiment of this application.

FIG. 3 shows an IDC indication message sending method according to an embodiment of this application. The IDC indication message sending method includes the following steps:

Step 301: A network device sends configuration information to a terminal device.

It should be noted that the configuration information may be carried in a radio resource control (radio resource control, RRC) connection reconfiguration message.

During specific implementation, the configuration information may indicate that the terminal device can send an IDC indication message; or the configuration information may indicate that the terminal device cannot send the IDC indication message.

Step 302: if the configuration information indicates that the terminal device can send the IDC indication message, the terminal device sends the IDC indication message to the network device.

In a case, that the terminal device sends the IDC indication message to the network device includes: The terminal device detects that IDC interference exists on a frequency supported by the terminal device, and the terminal device sends the IDC indication message to the network device.

In another case, that the terminal device sends the IDC indication message to the network device includes: If the terminal device detects that IDC interference exists on a frequency supported by the terminal device, the terminal device cannot resolve the IDC interference, and the configuration information indicates that the terminal device can send the IDC indication message, the terminal device sends the IDC indication message to the network device.

In a case, that the terminal device detects that the IDC interference exists on the frequency supported by the terminal device includes: The terminal device detects that the IDC interference exists or may be to exist on the frequency supported by the terminal device. Specifically, an inter-RAT technology module (for example, a WLAN module) in the terminal device may exchange information such as a working frequency, a receive slot, and a transmit slot with a cellular modulation (modem) module, so that it can be determined that the IDC interference may exist or may be to exist inside the terminal device.

In a case, the IDC indication message includes at least one of the following parameters: interfering frequency indication information, first power indication information, second power indication information, priority indication information, and manner indication information. The interfering frequency indication information is used to indicate supplementary uplink SUL frequency information or a type of an interfering frequency. The first power indication information is used to indicate a transmit power of the terminal device. The second power indication information is used to indicate a transmit power of the network device. The priority indication information is used to indicate a priority of a frequency band in which the interfering frequency is located. The manner indication information is used to indicate an IDC interference cancellation manner expected by the terminal device.

In a case, the interfering frequency indication information includes an MO of the interfering frequency or the SUL frequency information of the interfering frequency.

It should be noted that there is a correspondence between an MO, a normal uplink frequency, and an SUL frequency. Therefore, after obtaining the MO, the network device may obtain a corresponding interfering frequency based on the correspondence between an MO, a normal uplink frequency, and an SUL frequency.

During specific implementation, one MO may correspond to one normal uplink frequency, or one MO may correspond to one normal uplink frequency and one SUL frequency.

For example, if the MO of the interfering frequency corresponds to one normal uplink frequency, the interfering frequency indication information may include the MO of the interfering frequency, but does not include the SUL frequency information of the interfering frequency, and the network device may obtain, based on the MO of the interfering frequency, the normal uplink frequency corresponding to the MO.

For another example, if the MO of the interfering frequency corresponds to one normal uplink frequency and one SUL frequency, and the interfering frequency is the SUL frequency, the interfering frequency indication information may include the SUL frequency information of the interfering frequency, but does not include the MO of the interfering frequency, and the network device may obtain the SUL frequency of the interfering frequency based on the SUL frequency information of the interfering frequency.

During specific implementation, the SUL frequency information of the interfering frequency may be a list of SUL frequencies, indicating at least one interfering SUL frequency, or indicating at least one interfered SUL frequency.

For example, the network device is configured with three SUL frequencies: an SUL frequency 1, an SUL frequency 2, and an SUL frequency 3. If no interference exists on the SUL frequency 1, and interference exists on the SUL frequency 2 and the SUL frequency 3, the SUL frequency information of the interfering frequency may include the SUL frequency 2 and the SUL frequency 3.

It should be noted that the interfering frequency in the embodiment of this application may indicate an interfering frequency or an interfered frequency. The interfering frequency may indicate that signal sending on a cellular frequency may interfere with signal receiving on a frequency of an inter-RAT, and the interfered frequency may indicate that signal receiving on the cellular frequency is interfered with by signal sending on the frequency of the inter-RAT, where the inter-RAT may indicate a system other than a cellular system, for example, an ISM system.

In a case, if the interfering frequency indication information includes the MO of the interfering frequency, the interfering frequency indication information further includes first type indication information. The first type indication information is used to indicate a type of the interfering frequency. The type of the interfering frequency includes the normal uplink frequency and the SUL frequency.

During specific implementation, if the MO of the interfering frequency corresponds to one normal uplink frequency and one SUL frequency, the interfering frequency indication information may include the MO of the interfering frequency and the first type indication information, and the network device may obtain frequency information of a corresponding frequency type of the interfering frequency based on the MO of the interfering frequency and the first type indication information.

For example, one bit may be used to indicate the type of the interfering frequency. For example, if the first type indication information is 0, it may indicate that the type of the interfering frequency is the normal uplink, namely, an uplink in an LTE network, and after obtaining the MO, the network device may obtain the normal uplink frequency corresponding to the MO. For another example, if the first type indication information is 1, it may indicate that the type of the interfering frequency is the SUL, and after obtaining the MO, the network device may obtain the SUL frequency corresponding to the MO.

For another example, one bit may be used to indicate the type of the interfering frequency. For example, if the interfering frequency indication information does not include the first type indication information, it may indicate that the type of the interfering frequency is the normal uplink, and after obtaining the MO, the network device may obtain the normal uplink frequency corresponding to the MO. For another example, if the interfering frequency indication information includes the first type indication information, it may indicate that the type of the interfering frequency is the SUL, and after obtaining the MO, the network device may obtain the SUL frequency corresponding to the MO, or vice versa.

In a case, the first power indication information may include at least one of the following parameters: a first transmit power of the interfering frequency, a first power difference of the interfering frequency, a first interference level of the interfering frequency, and a PHR of the interfering frequency. The first transmit power of the interfering frequency is a maximum transmit power of the terminal device, and the first power difference of the interfering frequency is a difference between a current transmit power of the terminal device and the first transmit power.

It should be noted that, to reduce IDC interference caused by a cellular frequency band to another frequency band, the network device may indicate the maximum transmit power of the terminal device based on the first power indication information, and the terminal device may adjust a transmit power of the terminal device based on the maximum transmit power indicated by the network device, to reduce the IDC interference. The maximum transmit power that is of the terminal device and that is indicated by the network device is less than the current transmit power of the terminal device.

In a case, the network device may schedule uplink power control, so that the maximum transmit power of the terminal device is less than the current transmit power of the terminal device.

In another case, the network device may configure or reconfigure the maximum transmit power of the terminal device by using RRC signaling, so that the maximum transmit power of the terminal device is less than the current transmit power of the terminal device.

For example, if the cellular frequency band interferes with an ISM frequency band, the first power indication information may include a first transmit power $h_1$ of the interfering frequency, and the network device may indicate that an absolute maximum transmit power of the terminal device is $h_1$.

For another example, if the cellular frequency band interferes with the ISM frequency band, the first power indication information may include a first power difference $d_1$ of the interfering frequency, and the network device may indicate that the absolute maximum transmit power of the terminal device is a difference between the current transmit power of the terminal device and $d_1$.

It should be noted that the network device may divide an interference parameter into N intervals, each interval corresponds to an interference level, and a corresponding maximum transmit power of the terminal device is allocated to each interference level. The interference parameter includes a degree of overlapping between an inter-RAT frequency band and a cellular frequency band or receiving sensitivity of the inter-RAT technology module in the terminal device. More overlapping parts between the inter-RAT frequency band and the cellular frequency band indicate lower receiving sensitivity of the inter-RAT technology module in the terminal device, where N is a positive integer. The network device may send, to the terminal device, the N intervals of the interference parameter and the interference levels corresponding to the N intervals. When the cellular frequency band interferes with the inter-RAT frequency band, the terminal device may obtain the interference parameter by using the information (for example, the operating frequency, the receive slot, and the transmit slot) exchanged between the inter-RAT technology module and the cellular modulation module in the terminal device, to determine an interference level of the cellular frequency band and send the interference level of the cellular frequency band to the network device. The network device may indicate a proper maximum transmit power to the terminal device based on the received interference level of the cellular frequency band.

Table 1 shows a correspondence between an interference parameter and an interference level that are determined by the network device and a maximum transmit power of the terminal device. When the cellular frequency band interferes with the inter-RAT frequency band, if the degree of overlapping, that is obtained by the terminal device, between the inter-RAT frequency band and the cellular frequency band is 30%, the terminal device may determine, based on the correspondence between an interference parameter and an interference level, that the interference level of the cellular frequency band is 2. Therefore, the first interference level of the interfering frequency included in the first power indication information is 2, and the network device may indicate, based on the first interference level, that the maximum transmit power of the terminal device is $h_2$.

TABLE 1

| Degree of overlapping between an inter-RAT frequency band and a cellular frequency band | Receiving sensitivity of an inter-RAT technology module in a terminal device | Interference level | Maximum transmit power |
|---|---|---|---|
| [0, 25%) | [$a_1$, $a_2$) | 1 | $h_1$ |
| [25%, 50%) | [$a_2$, $a_3$) | 2 | $h_2$ |
| [50%, 75%) | [$a_3$, $a_4$) | 3 | $h_3$ |
| [75%, 100%] | [$a_4$, $a_5$] | 4 | $h_4$ |

It should be noted that the terminal device may divide the interference parameter into M intervals, each interval corresponds to an interference level, and a corresponding maximum transmit power of the terminal device is allocated to each interference level. The interference parameter includes the degree of overlapping between the inter-RAT frequency band and the cellular frequency band or the receiving sensitivity of the inter-RAT technology module in the terminal device. More overlapping parts between the inter-RAT frequency band and the cellular frequency band indicate lower receiving sensitivity of the inter-RAT technology module in the terminal device, where M is a positive integer. The terminal device may send, to the network device, the interference levels corresponding to the M intervals and the maximum transmit powers of the terminal device corresponding to the M intervals. When the cellular frequency band interferes with the inter-RAT frequency band, the terminal device may obtain the interference parameter by using the information (for example, the operating frequency, the receive slot, and the transmit slot) exchanged between the inter-RAT technology module and the cellular modulation module in the terminal device, to determine an interference level of the cellular frequency band and send the interference level of the cellular frequency band to the network device. The network device may indicate a proper maximum transmit power to the terminal device based on the received interference level of the cellular frequency band.

Table 2 shows a correspondence between an interference parameter and an interference level that are determined by the terminal device and a maximum transmit power of the terminal device. When the cellular frequency band interferes with the inter-RAT frequency band, if the receiving sensitivity of the inter-RAT technology module in the terminal device falls within an interval [$b_3$, $b_4$), the terminal device may determine, based on the correspondence between an interference parameter and an interference level, that the interference level of the cellular frequency band is 3. Therefore, the first interference level of the interfering frequency included in the first power indication information is 3, and the network device may indicate, based on the first interference level, that the maximum transmit power of the terminal device is $h_7$.

TABLE 2

| Degree of overlapping between an inter-RAT frequency band and a cellular frequency band | Receiving sensitivity of an inter-RAT technology module in a terminal device | Interference level | Maximum transmit power |
|---|---|---|---|
| [0, 30%) | [$b_1$, $b_2$) | 1 | $h_5$ |
| [30%, 55%) | [$b_2$, $b_3$) | 2 | $h_6$ |
| [55%, 80%) | [$b_3$, $b_4$) | 3 | $h_7$ |
| [80%, 100%] | [$b_4$, $b_5$] | 4 | $h_8$ |

It should be noted that the foregoing correspondence between an interference parameter, an interference level, and a maximum transmit power of the terminal device may be pre-specified, and the network device or the terminal device determines the interference level based on the pre-specified relationship.

It should be noted that, if the first power indication information includes the PHR of the interfering frequency, and a power headroom reported by the PHR is a negative value, the network device may indicate a proper maximum transmit power to the terminal device based on a value of the power headroom reported by the PHR, so that the value of the power headroom reported by the PHR is greater than or equal to 0.

For example, if the power headroom reported by the PHR of the interfering frequency is a negative value, the network device may configure or reconfigure, for the terminal device by using RRC signaling, a transmit power that is less than the current transmit power of the terminal device, so that the value of the power headroom reported by the PHR is greater than or equal to 0.

In a case, the second power indication information includes at least one of the following parameters: a second transmit power of the interfering frequency, a second power difference of the interfering frequency and a second interference level of the interfering frequency. The second transmit power of the interfering frequency is a minimum transmit power of the network device, and the second power difference of the interfering frequency is a difference between a current transmit power of the network device and the second transmit power.

It should be noted that, to reduce IDC interference caused by another frequency band to the cellular frequency band, the network device may configure the minimum transmit power of the network device based on the first power indication information, and the network device may send information to the terminal device by using a power greater than or equal to the minimum transmit power. The minimum transmit power of the network device is greater than the current transmit power of the network device.

If the ISM frequency band interferes with the cellular frequency band, the second power indication information may include a second transmit power $h_2$ of the interfering frequency, and the network device may configure an absolute minimum transmit power of the network device to be $h_2$.

If the ISM frequency band interferes with the cellular frequency band, the second power indication information may include a second power difference $d_2$ of the interfering frequency, and the network device may configure the absolute minimum transmit power of the network device to be a sum of the current transmit power of the network device and $d_2$.

It should be noted that the network device may divide an interference parameter into P intervals, each interval corresponds to an interference level, and a corresponding minimum transmit power of the network device is allocated to each interference level. The interference parameter includes the degree of overlapping between the inter-RAT frequency band and the cellular frequency band or the receiving sensitivity of the inter-RAT technology module in the terminal device. More overlapping parts between the inter-RAT frequency band and the cellular frequency band indicate lower receiving sensitivity of the inter-RAT technology module in the terminal device, where P is a positive integer. The network device may send, to the terminal device, the P intervals of the interference parameter and the interference levels corresponding to the P intervals. When the inter-RAT frequency band interferes with the cellular frequency band, the terminal device may obtain the interference parameter by using the information (for example, the operating frequency, the receive slot, and the transmit slot) exchanged between the inter-RAT technology module and the cellular modulation module in the terminal device, to determine an interference level of the inter-RAT frequency band and send the interference level of the inter-RAT frequency band to the network device. The network device may configure a proper minimum transmit power for the network device based on the received interference level of the inter-RAT frequency band.

Table 3 shows a correspondence between an interference parameter and an interference level that are determined by the network device and a minimum transmit power of the network device. When the inter-RAT frequency band interferes with the cellular frequency band, if the degree of overlapping between the inter-RAT frequency band and the cellular frequency band is 30%, the terminal device may determine, based on the correspondence between an interference parameter and an interference level, that the interference level of the inter-RAT frequency band is 2. Therefore, the second interference level of the interfering frequency included in the second power indication information is 2, and the network device may configure a minimum transmit power $H_2$ for the network device based on the second interference level.

TABLE 3

| Degree of overlapping between an inter-RAT frequency band and a cellular frequency band | Receiving sensitivity of an inter-RAT technology module in a terminal device | Interference level | Maximum transmit power |
| --- | --- | --- | --- |
| [0, 25%) | [$a_1$, $a_2$) | 1 | $H_1$ |
| [25%, 50%) | [$a_2$, $a_3$) | 2 | $H_2$ |
| [50%, 75%) | [$a_3$, $a_4$) | 3 | $H_3$ |
| [75%, 100%] | [$a_4$, $a_5$] | 4 | $H_4$ |

It should be noted that the terminal device may divide the interference parameter into Q intervals, each interval corresponds to an interference level, and a corresponding minimum transmit power of the network device is allocated to each interference level. The interference parameter includes the degree of overlapping between the inter-RAT frequency band and the cellular frequency band or the receiving sensitivity of the inter-RAT technology module in the terminal device. More overlapping parts between the inter-RAT frequency band and the cellular frequency band indicate lower receiving sensitivity of the inter-RAT technology module in the terminal device, where Q is a positive integer. The terminal device may send, to the network device, the interference levels corresponding to the Q intervals and the minimum transmit powers of the network device corresponding to the Q intervals. When the inter-RAT frequency band interferes with the cellular frequency band, the terminal device may obtain the interference parameter by using the information (for example, the operating frequency, the receive slot, and the transmit slot) exchanged between the inter-RAT technology module and the cellular modulation module in the terminal device, to determine an interference level of the inter-RAT frequency band and send the interference level of the inter-RAT frequency band to the network device. The network device may configure a proper minimum transmit power for the network device based on the received interference level of the inter-RAT frequency band.

Table 4 shows a correspondence between an interference parameter and an interference level that are determined by the terminal device and a minimum transmit power of the network device. When the inter-RAT frequency band interferes with the cellular frequency band, if the receiving sensitivity of the inter-RAT technology module in the terminal device falls within an interval [$b_3$, $b_4$), the terminal device may determine, based on the correspondence between an interference parameter and an interference level, that the interference level of the inter-RAT frequency band is 3. Therefore, the second interference level of the interfering frequency included in the second power indication information is 3, and the network device may configure a minimum transmit power $H_7$ for the network device based on the second interference level.

TABLE 4

| Degree of overlapping between an inter-RAT frequency band and a cellular frequency band | Receiving sensitivity of an inter-RAT technology module in a terminal device | Interference level | Maximum transmit power |
| --- | --- | --- | --- |
| [0, 30%) | [$b_1$, $b_2$) | 1 | $H_5$ |
| [30%, 55%) | [$b_2$, $b_3$) | 2 | $H_6$ |
| [55%, 80%) | [$b_3$, $b_4$) | 3 | $H_7$ |
| [80%, 100%] | [$b_4$, $b_5$] | 4 | $H_8$ |

It should be noted that the foregoing correspondence between an interference parameter, an interference level, and a maximum transmit power of the terminal device may be pre-specified, and the network device or the terminal device determines the interference level based on the pre-specified relationship.

In a case, the priority indication information includes second type indication information. The second type indication information is used to indicate a type of the frequency band in which the interfering frequency is located. The type of the frequency band in which the interfering frequency is located includes the cellular frequency band and the ISM frequency band.

During specific implementation, the second type indication information may indicate, by using 1-bit indication information, the type of the frequency band in which the interfering frequency is located, or indicate, in an enumeration manner, the type of the frequency band in which the interfering frequency is located.

During specific implementation, if the second type indication information is 0, it may indicate that a priority of information transmitted by the terminal device in the cellular frequency band is higher than a priority of information transmitted by the terminal device in the ISM frequency band; or if the second type indication information included in the priority indication information is 1, it may indicate that a priority of information transmitted by the terminal device in the ISM frequency band is higher than a priority of information transmitted by the terminal device in the cellular frequency band.

During specific implementation, if the second type indication information is 0, it may indicate that a priority of information transmitted by the terminal device in the cellular frequency band is higher than a priority of information transmitted by the terminal device in the ISM frequency band; if the second type indication information included in the priority indication information is 1, it may indicate that a priority of information transmitted by the terminal device in the ISM frequency band is higher than a priority of information transmitted by the terminal device in the cellular frequency band; or if the second type indication information is empty or the priority indication information does not include the second type indication information, it may indicate that a priority of information transmitted by the terminal device in the ISM frequency band is the same as a priority of information transmitted by the terminal device in the cellular frequency band.

During specific implementation, the second type indication information may include cellular or other. If the second type indication information is cellular, it may indicate that a priority of information transmitted by the terminal device in the cellular frequency band is higher than a priority of information transmitted by the terminal device in the ISM frequency band; or if the second type indication information is other, it may indicate that a priority of information transmitted by the terminal device in the ISM frequency band is higher than a priority of information transmitted by the terminal device in the cellular frequency band.

During specific implementation, the second type indication information may include cellular or other. If the second type indication information is cellular, it may indicate that a priority of information transmitted by the terminal device in the cellular frequency band is higher than a priority of information transmitted by the terminal device in the ISM frequency band; if the second type indication information is other, it may indicate that a priority of information transmitted by the terminal device in the ISM frequency band is higher than a priority of information transmitted by the terminal device in the cellular frequency band; or if the second type indication information is empty or the priority indication information does not include the second type indication information, it may indicate that a priority of information transmitted by the terminal device in the ISM frequency band is the same as a priority of information transmitted by the terminal device in the cellular frequency band.

During specific implementation, the second type indication information may include cellular, other, or equality. If the second type indication information is cellular, it may indicate that a priority of information transmitted by the terminal device in the cellular frequency band is higher than a priority of information transmitted by the terminal device in the ISM frequency band; if the second type indication information is other, it may indicate that a priority of information transmitted by the terminal device in the ISM frequency band is higher than a priority of information transmitted by the terminal device in the cellular frequency band; or if the second type indication information is equality, it may indicate that a priority of information transmitted by the terminal device in the ISM frequency band is the same as a priority of information transmitted by the terminal device in the cellular frequency band.

During specific implementation, the second type indication information may include cellular, wlan, bluetooth, or GNSS. If the second type indication information is cellular, it may indicate that a priority of information transmitted by the terminal device in the cellular frequency band is highest; if the second type indication information is wlan, it may indicate that a priority of information transmitted by the terminal device in a Wi-Fi frequency band is highest; if the second type indication information is bluetooth, it may indicate that a priority of information transmitted by the terminal device in a Bluetooth frequency band is highest; if the second type indication information is GNSS, it may indicate that a priority of information received by the terminal device in a GNSS frequency band is highest; or if the second type indication information is empty, it may indicate that a priority of information transmitted by the terminal device in the cellular frequency band, a priority of information transmitted by the terminal device in a Wi-Fi frequency band, a priority of information transmitted by the terminal device in a Bluetooth frequency band, and a priority of information received by the terminal device in a GNSS frequency band are the same.

During specific implementation, the second type indication information may include cellular, wlan, bluetooth, GNSS, or equality. If the second type indication information is cellular, it may indicate that a priority of information transmitted by the terminal device in the cellular frequency band is highest; if the second type indication information is wlan, it may indicate that a priority of information transmitted by the terminal device in a Wi-Fi frequency band is highest; if the second type indication information is bluetooth, it may indicate that a priority of information transmitted by the terminal device in a Bluetooth frequency band is highest; if the second type indication information is GNSS, it may indicate that a priority of information received by the terminal device in a frequency band corresponding to a global navigation satellite system is highest; or if the second type indication information is equality, it may indicate that a priority of information transmitted by the terminal device in the cellular frequency band, a priority of information transmitted by the terminal device in a Wi-Fi frequency band, a priority of information transmitted by the terminal device in a Bluetooth frequency band, and a priority of information received by the terminal device in a frequency band corresponding to a global navigation satellite system are the same.

During specific implementation, cellular may include eutra or nr. If the second type indication information is entra, it may indicate that a priority of information transmitted by the terminal device in an LTE frequency band is highest; or if the second type indication information is nr, it may indicate that a priority of information transmitted by the terminal device in an NR frequency band is highest, cellular may further include eutra-nr. If the second type indication information is eutra-nr, it may indicate that a priority of information transmitted by the terminal device in a frequency band corresponding to EN-DC is highest. GNSS may include gps, glonass, bds, or galileo. If the second type indication information is gps, it may indicate that a priority of information received by the terminal device in a frequency band corresponding to a global positioning system is highest; if the second type indication information is glonass, it may indicate that a priority of information received by the terminal device in a frequency band corresponding to a global navigation satellite system is highest; if the second type indication information is bds, it may indicate that a priority of information received by the terminal device in a frequency band corresponding to the China's Beidou navigation satellite system is highest; or if the second type indication information is galileo, it may indicate that a priority of information received by the terminal device in a frequency band corresponding to the Galileo satellite navigation system is highest.

In a case, the priority indication information may further include first frequency information. The first frequency information is used to indicate one or more interfering frequencies.

For example, if the terminal device detects that IDC interference occurs on three frequencies, and priorities of information transmitted by the terminal device in frequency bands in which the three frequencies are located are the same, the priority indication information may include {interfering frequency 1, interfering frequency 2, interfering frequency 3, a frequency band type}.

For another example, if the terminal device detects that IDC interference occurs on three frequencies, and priorities of information transmitted by the terminal device in frequency bands in which the three frequencies are located are different, the priority indication information may include {interfering frequency 1, frequency band type 1, interfering frequency 2, frequency band type 2, interfering frequency 3, frequency band type 3}.

In a case, the manner indication information includes first manner information or second manner information. The first manner information is used to indicate that the terminal device expects the network device not to send data temporarily, and the second manner information is used to indicate that the terminal device expects the network device to use a frequency division multiplexing manner.

During specific implementation, the first manner indication information may indicate, by using one bit, that the terminal device expects the network device not to send the data temporarily.

For example, if the first manner information is 1, it indicates that the terminal device expects the network device not to send the data temporarily; or if the first manner information is 0, it indicates that the terminal device expects the network device to send the data normally.

During specific implementation, if the first manner information indicates that the terminal device expects the network device not to send the data temporarily, the first manner information may further include first configuration parameter information. The first configuration parameter information is used to indicate a downlink denial parameter expected by the terminal device.

In a case, the first configuration parameter information may include downlink denial mode information and a downlink denial cycle, where the downlink denial mode information includes a first denial mode, a second denial mode, and a first time length, and the downlink denial cycle is used to indicate a time length of the first denial mode or the second denial mode.

In a case, if the downlink denial cycle is R ms, the first denial mode may indicate that the network device sends the data to the terminal device in the first n ms in the downlink denial cycle, but does not send the data to the terminal device in the last m ms in the downlink denial cycle, and the second denial mode may indicate that the network device does not send the data to the terminal device in the first m ms in the downlink denial cycle, but sends data to the terminal device in the last n ms in the downlink denial cycle, where n+m=R The first time length may include at least one of a time length n for sending the data by the network device to the terminal device and a time length m for not sending the data by the network device to the terminal device in the downlink denial cycle.

For example, if the first manner information indicates that the terminal device expects the network device not to send the data temporarily, and the first manner information further includes the first configuration parameter information, where the first configuration parameter information indicates that R=10, the downlink denial mode is the second denial mode, and m=6, the network device may not send the data to the terminal device in the first 6 ms, and send the data to the terminal device in the last 4 ms.

In another case, if the downlink denial cycle is R ms, the first denial mode may indicate that the network device does not send the data to the terminal device in the first m ms in the downlink denial cycle, but sends the data to the terminal device in the last n ms in the downlink denial cycle, and the second denial mode may indicate that the network device sends the data to the terminal device in the first n ms in the downlink denial cycle, but does not send the data to the terminal device in the last m ms in the downlink denial cycle, where n+m=R. The first time length may include at least one of a time length n for sending the data by the network device to the terminal device and a time length m for not sending the data by the network device to the terminal device in the downlink denial cycle.

For example, if the first manner information indicates that the terminal device expects the network device not to send the data temporarily, and the first manner information further includes the first configuration parameter information, where the first configuration parameter information indicates that R=10, the downlink denial mode is the second denial mode, and n=5, the network device may send the data to the terminal device in the first 5 ms, and may not send data to the terminal device in the last 5 ms.

In a case, the first configuration parameter information may further include a second time length. The second time length is used to indicate a time length for sending the data by the network device in the first denial mode or the second denial mode.

For example, the first manner information indicates that the terminal device expects the network device not to send the data temporarily, and the first manner information further includes the first configuration parameter information, where the first configuration parameter information indicates that R=15, the downlink denial mode is that the network device does not send the data to the terminal device in the first m ms in the downlink denial cycle but sends the data to the terminal device in the last n ms in the downlink denial cycle, m=10, n=5, and the second time length is 10 min. Therefore, the network device may send the data within 10 min in the denial mode. To be specific, the network device does not send the data to the terminal device from the $1^{st}$ ms to the $10^{th}$ ms, sends the data to the terminal device from the $11^{th}$ ms to the $15^{th}$ ms, does not send the data to the terminal device from the $16^{th}$ ms to the $25^{th}$ ms, sends the data to the terminal device from the $26^{th}$ ms to the $30^{th}$ ms, does not send the data to the terminal device from the $31^{st}$ ms to the $40^{th}$ ms, sends the data to the terminal device from the $41^{st}$ ms to the $45^{th}$ ms, and so on.

During specific implementation, the second manner information may indicate, by using one bit, that the terminal device expects the network device to use the frequency division multiplexing manner.

If the second manner information is 1, it may indicate that the terminal device expects the network device to send information in a frequency division multiplexing manner, or if the second manner information is 0, it may indicate that the terminal device does not limit an information sending manner.

Alternatively, if the second manner information is 1, it may indicate that the terminal device expects the network device to send information in a frequency division multiplexing manner; or if the second manner information is 0, it may indicate that the terminal device expects the network device to send information in a time division multiplexing manner.

Figure 4:
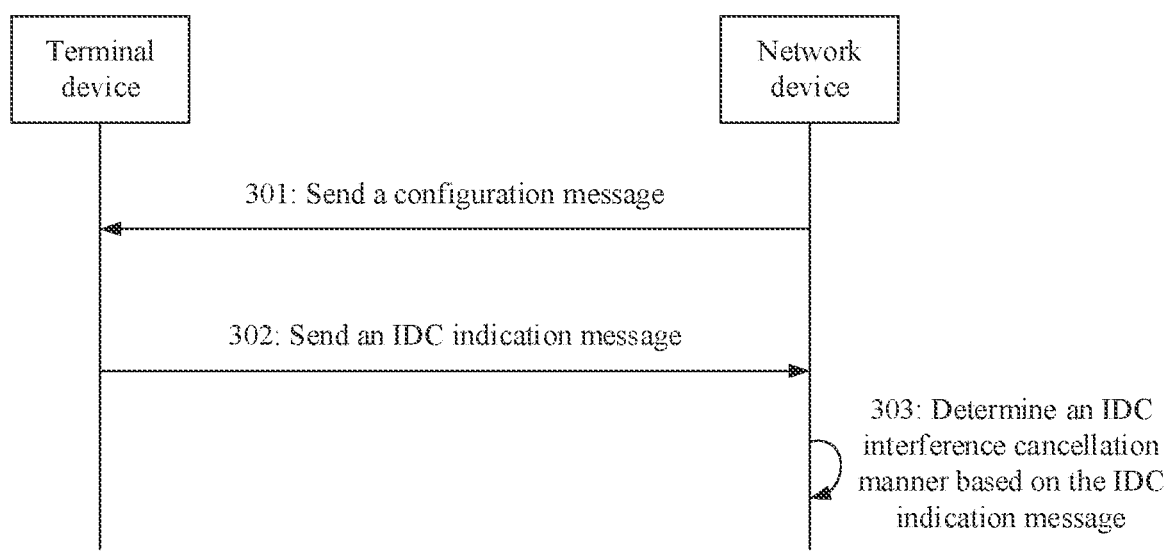
FIG. 4 is a schematic flowchart 2 of an IDC indication message sending method according to an embodiment of this application.

As shown in FIG. 4, after step 302, the IDC indication message sending method may further include the following step: Step 303: The network device determines, based on the IDC indication message, an IDC interference cancellation manner.

It should be noted that, the network device may cancel the IDC interference in a frequency division multiplexing manner, a time division multiplexing manner, or a manner of configuring uplink autonomous denial (UL autonomous denial).

It should be noted that the frequency division multiplexing manner is to remove an interfering frequency band from an interfered frequency band, or remove an interfered frequency band from an interfering frequency, to cancel IDC interference between a plurality of access technologies. For example, an inter-frequency handover is performed inside the cellular network, to reconfigure or deactivate an interfered secondary cell. For another example, in an uplink carrier aggregation (carrier aggregation, CA) scenario, a proper uplink resource is allocated to avoid cross-modulation (inter-modulation distortion, IMD) interference and harmonic (harmonics) interference.

It should be noted that the time division multiplexing manner is to stagger time for sending data on an interfering frequency band and time for receiving data on an interfered frequency band, or stagger time for receiving data on an interfering frequency band and time for sending data on an interfered frequency band, to cancel IDC interference between a plurality of access technologies. During specific implementation, for the cellular network, the network device may configure discontinuous reception (discontinuous reception, DRX) for the terminal device. Within a determined period of time, the terminal device does not receive data on the cellular frequency band, and may send the data on the ISM frequency band. For example, for the cellular network, the network device may configure the discontinuous reception for the terminal device by using RRC signaling, and the network device may further configure a discontinuous reception time length t of the terminal device by using the RRC signaling. In this case, the terminal device does not receive the data on the cellular frequency band within the time length t.

It should be noted that, in the uplink autonomous denial manner, the network device configures a UL autonomous denial parameter for the terminal device, so that the terminal device does not perform uplink sending, thereby protecting the terminal device from being interfered with when the terminal device receives information on the ISM frequency band. If the network device does not configure the UL autonomous denial parameter for the terminal device, the terminal device may normally perform uplink sending. During specific implementation, the network device may configure the UL autonomous denial parameter for the terminal device, to protect the terminal device from being interfered with when the terminal device receives information on the ISM frequency band. Alternatively, an ISM system may protect, by using an uplink autonomous denial method, the terminal device from being interfered with when the terminal device receives information on the cellular frequency band. For example, the network device may configure, by using the RRC signaling, that the terminal device does not perform uplink sending, and the network device may further configure, by using the RRC signaling, a quantity of times N for which the terminal device does not perform uplink sending. If the terminal device needs to send information to the network device for R times, where R>N, the terminal device does not send information at the first N times to the network device, but sends information from the (N+1)$^{th}$ times to the R times to the network device.

During specific implementation, if the IDC indication message includes interfering frequency indication information, and the interfering frequency indication information includes the SUL frequency information of the interfering frequency, the network device may configure a new frequency for an SUL to cancel the IDC interference.

During specific implementation, if the IDC indication message includes the first power indication information, and the first power indication information includes the first transmit power of the interfering frequency, the network device may indicate, to the terminal device, the first transmit power lower than the current transmit power, to cancel the IDC interference.

During specific implementation, if the IDC indication message includes the second power indication information, and the second power indication information includes the second power difference of the interfering frequency, the minimum transmit power configured by the network device for the network device may be a sum of the current transmit power of the network device and the second power difference of the interfering frequency, to cancel the IDC interference.

During specific implementation, if the IDC indication message includes the priority indication information, and the second type indication information in the priority indication information indicates the ISM frequency band, it indicates that the priority of the information transmitted by the terminal device on the ISM frequency band is higher than the priority of the information transmitted by the terminal device on the cellular frequency band. In this way, the network device may configure the terminal device not to receive information or send information on the cellular frequency band within the time length t, to cancel the IDC interference.

During specific implementation, if the IDC indication message includes the manner indication information, the manner indication information includes the first manner information, the first manner information indicates, by using one bit, that the terminal device expects the network device not to send the data temporarily, the first manner information may further include a third time length T, and the third time length is a time length for not sending the data by the network device to the terminal device, the network device may not send the data to the terminal device within the time length T.

It should be noted that, if the IDC indication message includes a plurality of the following parameters: the interfering frequency indication information, the first power indication information, the second power indication information, the priority indication information, and the manner indication information, the network device may comprehensively consider the IDC indication message and a current network environment, to determine a proper IDC interference cancellation manner.

For example, for description, the IDC indication message includes the interfering frequency indication information and the priority indication information, the interfering frequency indication information includes the MO and the first type indication information, and the priority indication information includes the second type indication information. If a type indicated by the first type indication information is a normal uplink frequency, and the second type indication information indicates an ISM frequency band, the network device may obtain the normal uplink frequency based on the IDC indication message, and determine that a priority of information transmitted by the terminal device in the ISM frequency band is higher than a priority of information transmitted by the terminal device in a cellular frequency band. If the network device further determines that an interference direction of the interfering frequency is that the ISM frequency band interferes with the cellular frequency band, the network device may cancel the IDC interference by configuring a new frequency for a normal uplink.

The foregoing mainly describes the solutions provided in the embodiments of this application from a perspective of interaction between network elements. It may be understood that, to implement the foregoing functions, the terminal device, the network device, or the like includes corresponding hardware structures and/or software modules for performing the functions. A person skilled in the art should easily be aware that, in combination with units and algorithm steps of the examples described in the embodiments disclosed in this specification, this application may be implemented in a hardware form or in a form of combining hardware with computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function modules of the terminal device or the network device may be divided based on the foregoing method examples. For example, function modules may be divided corresponding to functions, or two or more functions may be integrated into one processing module. The integrated module may be implemented in a form of hardware, or may be implemented in a form of a software function module. It should be noted that, in the embodiments of this application, division into modules is an example, and is merely a logical function division. During actual implementation, another division manner may be used.

Figure 5:
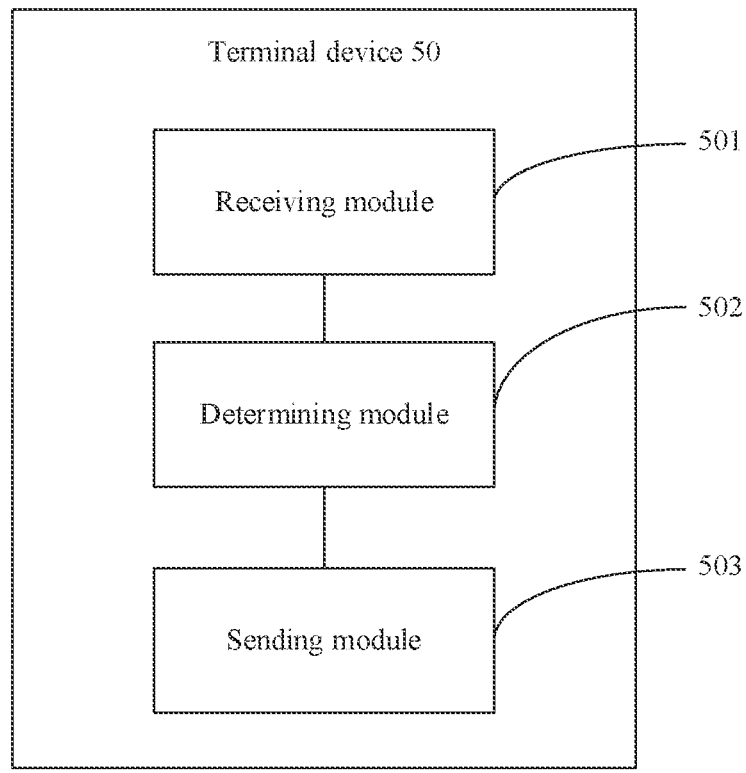
FIG. 5 is a schematic structural diagram of a terminal device according to an embodiment of this application.

For example, if function modules are obtained through division performed in an integrated manner, FIG. 5 is a schematic structural diagram of a terminal device 50. The terminal device 50 includes a receiving module 501, a determining module 502, and a sending module 503. The receiving module 501 is configured to enable the terminal device to receive configuration information sent by a network device; the determining module 502 is configured to determine that the configuration information indicates that the terminal device can send an IDC indication message, and the sending module 503 is configured to enable the terminal device to send the IDC indication message to the network device. The IDC indication message includes at least one of the following parameters: interfering frequency indication information, first power indication information, second power indication information, priority indication information, and manner indication information. The interfering frequency indication information is used to indicate supplementary uplink SUL frequency information or a type of an interfering frequency. The first power indication information is used to indicate a transmit power of the terminal device. The second power indication information is used to indicate a transmit power of the network device. The priority indication information is used to indicate a priority of a frequency band in which the interfering frequency is located. The manner indication information is used to indicate an IDC interference cancellation manner expected by the terminal device.

In a case, the interfering frequency indication information includes a measurement object MO of the interfering frequency or the SUL frequency information of the interfering frequency.

In a case, if the interfering frequency indication information includes the MO of the interfering frequency, the interfering frequency indication information further includes first type indication information. The first type indication information is used to indicate the type of the interfering frequency.

In a case, the first power indication information includes at least one of the following parameters: a first transmit power of the interfering frequency, a first power difference of the interfering frequency, a first interference level of the interfering frequency, and a power headroom report PHR of the interfering frequency. The first transmit power of the interfering frequency is a maximum transmit power of the terminal device, and the first power difference of the interfering frequency is a difference between a current transmit power of the terminal device and the first transmit power.

In a case, the second power indication information includes at least one of the following parameters: a second transmit power of the interfering frequency, a second power difference of the interfering frequency and a second interference level of the interfering frequency. The second transmit power of the interfering frequency is a minimum transmit power of the network device, and the second power difference of the interfering frequency is a difference between a current transmit power of the network device and the second transmit power.

In a case, the priority indication information includes second type indication information. The second type indication information is used to indicate a type of the frequency band in which the interfering frequency is located.

In a case, the manner indication information includes first manner information or second manner information. The first manner information is used to indicate that the terminal device expects the network device not to send data temporarily, and the second manner information is used to indicate that the terminal device expects the network device to use a frequency division multiplexing manner.

In a case, that the terminal device sends the IDC indication message to the network device further includes: The terminal device detects that IDC interference exists in a frequency band supported by the terminal device; and the terminal device sends the IDC indication message to the network device.

All related content of the steps in the foregoing method embodiments may be cited in function descriptions of the corresponding function modules. Details are not described herein again.

In this embodiment, the terminal device 50 is presented in a form of function modules obtained through division performed in an integrated manner. The "module" herein may be a specific ASIC, a circuit, a processor that executes one or more software or firmware programs, a memory, an integrated logic circuit, and/or another component that can provide the foregoing functions. In a simple embodiment, a person skilled in the art may figure out that the terminal device 50 may be in a form shown in FIG. 2.

For example, the processor 201 in FIG. 2 may invoke a computer-executable instruction stored in the memory 203, so that the terminal device 50 performs the IDC indication message sending method in the foregoing method embodiments.

For example, functions/implementation processes of the receiving module 501, the sending module 503, and the determining module 502 in FIG. 5 may be implemented by the processor 201 in FIG. 2 by invoking the computer-executable instruction stored in the memory 203. Alternatively, functions/implementation processes of the determining module 502 in FIG. 5 may be implemented by the processor 201 in FIG. 2 by invoking the computer-executable instruction stored in the memory 203, and functions/implementation processes of the receiving module 501 and the sending module 503 in FIG. 5 may be implemented through the communications interface 204 in FIG. 2.

The terminal device 50 provided in this embodiment may perform the foregoing IDC indication message sending methods. Therefore, for technical effects that can be obtained by the terminal device 50, refer to the foregoing method embodiments. Details are not described herein again.

An embodiment of this application further provides an apparatus (for example, the apparatus may be a chip system). The apparatus includes a processor configured to support a terminal device 50 to implement the foregoing IDC indication message sending method, for example, the terminal device receives configuration information sent by a network device, and if the configuration information indicates that the terminal device can send an IDC indication message, the terminal device sends the IDC indication message to the network device. In a possible design, the apparatus further includes a memory. The memory is configured to store a program instruction and data that are required by the terminal device. Certainly, the memory may alternatively not be in the apparatus. When the apparatus is a chip system, the apparatus may include a chip, or may include a chip and another separate device. This is not specifically limited in the embodiment of this application.

Figure 6:
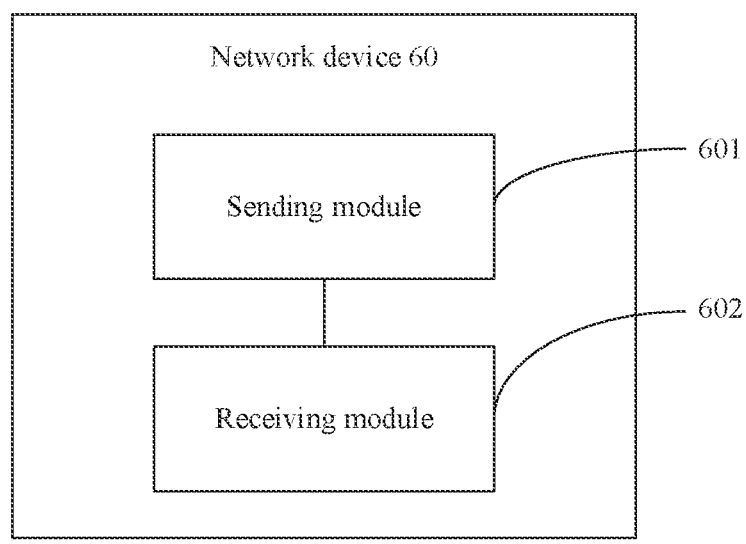
FIG. 6 is a schematic structural diagram 1 of a network device according to an embodiment of this application.

Alternatively, for example, if function modules are obtained through division performed in an integrated manner, FIG. 6 is a schematic structural diagram of a network device 60. The network device 60 includes a sending module 601 and a receiving module 602. The sending module 601 is configured to enable the network device to send configuration information to a terminal device; and the receiving module 602 is configured to enable the network device to receive an IDC indication message sent by the terminal device. The IDC indication message includes at least one of the following parameters: interfering frequency indication information, first power indication information, second power indication information, priority indication information, and manner indication information. The interfering frequency indication information is used to indicate SUL frequency information or a type of an interfering frequency. The first power indication information is used to indicate a transmit power of the terminal device. The second power indication information is used to indicate a transmit power of the network device. The priority indication information is used to indicate a priority of a frequency band in which the interfering frequency is located. The manner indication information is used to indicate an IDC interference cancellation manner expected by the terminal device.

In a case, the interfering frequency indication information includes an MO of the interfering frequency or the SUL frequency information of the interfering frequency.

In a case, if the interfering frequency indication information includes the MO of the interfering frequency, the interfering frequency indication information further includes first type indication information. The first type indication information is used to indicate the type of the interfering frequency.

In a case, the first power indication information includes at least one of the following parameters: a first transmit power of the interfering frequency, a first power difference of the interfering frequency, a first interference level of the interfering frequency, and a PHR of the interfering frequency. The first transmit power of the interfering frequency is a maximum transmit power of the terminal device, and the first power difference of the interfering frequency is a difference between a current transmit power of the terminal device and the first transmit power.

In a case, the network device indicates the maximum transmit power of the terminal device based on the first power indication information.

In a case, the second power indication information includes at least one of the following parameters: a second transmit power of the interfering frequency, a second power difference of the interfering frequency and a second interference level of the interfering frequency. The second transmit power of the interfering frequency is a minimum transmit power of the network device, and the second power difference of the interfering frequency is a difference between a current transmit power of the network device and the second transmit power.

In a case, the priority indication information includes second type indication information. The second type indication information is used to indicate a type of the frequency band in which the interfering frequency is located.

In a case, the manner indication information includes first manner information or second manner information. The first manner information is used to indicate that the terminal device expects the network device not to send data temporarily, and the second manner information is used to indicate that the terminal device expects the network device to use a frequency division multiplexing manner.

In a case, the IDC indication message is sent in cases in which IDC interference exists in a frequency band supported by the terminal device, the terminal device cannot resolve the IDC interference, and the configuration information indicates that the terminal device can send the IDC indication message.

Figure 7:
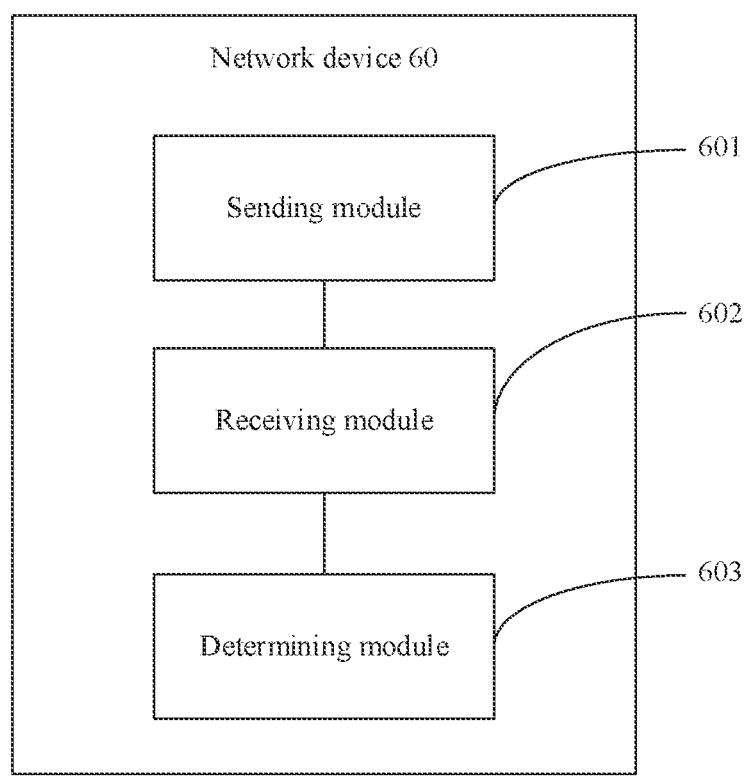
FIG. 7 is a schematic structural diagram 2 of a network device according to an embodiment of this application.

In a case, as shown in FIG. 7, a network device further includes a determining module 603. The determining module 603 is configured to enable the network device to determine an IDC interference cancellation manner based on the IDC indication message.

All related content of the steps in the foregoing method embodiments may be cited in function descriptions of the corresponding function modules. Details are not described herein again.

In this embodiment, the network device 60 is presented in a form of function modules obtained through division performed in an integrated manner. The "module" herein may be a specific ASIC, a circuit, a processor that executes one or more software or firmware programs, a memory, an integrated logic circuit, and/or another component that can provide the foregoing functions. In a simple embodiment, a person skilled in the art may figure out that the network device 60 may be in a form shown in FIG. 2.

For example, the processor 201 in FIG. 2 may invoke a computer-executable instruction stored in the memory 203, so that the network device 60 performs the IDC indication message sending method in the foregoing method embodiments.

For example, functions/implementation processes of the sending module 601, the receiving module 602, and the determining module 603 in FIG. 7 may be implemented by the processor 201 in FIG. 2 by invoking the computer-executable instruction stored in the memory 203. Alternatively, functions/implementation processes of the determining module 603 in FIG. 7 may be implemented by the processor 201 in FIG. 2 by invoking the computer-executable instruction stored in the memory 203, and functions/implementation processes of the sending module 601 and the receiving module 602 in FIG. 7 may be implemented through the communications interface 204 in FIG. 2.

The network device 60 provided in this embodiment may perform the foregoing IDC indication message sending methods. Therefore, for technical effects that can be obtained by the network device 60, refer to the foregoing method embodiments. Details are not described herein again.

An embodiment of this application further provides an apparatus (for example, the apparatus may be a chip system). The apparatus includes a processor configured to support a network device 60 to implement the foregoing IDC indication message sending method, for example, the network device sends configuration information to a terminal device; and the network device receives an IDC indication message sent by the terminal device. In a possible design, the apparatus further includes a memory. The memory is configured to store a program instruction and data that are required by the network device. Certainly, the memory may alternatively not be in the apparatus. When the apparatus is a chip system, the apparatus may include a chip, or may include a chip and another separate device. This is not specifically limited in the embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and appended claims. In the claims, "comprise" (comprising) does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to this application without departing from the spirit and scope of this application. Correspondingly, the specification and accompanying drawings are merely example description of this application defined by the appended claims, and is considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the protection scope defined by the following claims and their equivalent technologies.

What is claimed is:

1. An in-device coexistence (IDC) indication message sending method implemented by a terminal device, wherein the IDC indication message sending method comprises:
   receiving configuration information from a network device; and
   sending, when the configuration information indicates that the terminal device can send an IDC indication message, the IDC indication message to the network device,
   wherein the IDC indication message comprises interfering frequency indication information or priority indication information,
   wherein the interfering frequency indication information indicates supplementary uplink (SUL) frequency information or a type of an interfering frequency,
   wherein the interfering frequency indication information comprises a measurement object (MO) of the interfering frequency or the SUL frequency,
   wherein the priority indication information indicates a priority of a frequency band in which the interfering frequency is located, and
   wherein the priority indication information comprises second type indication information that indicates a type of the frequency band.

2. The IDC indication message sending method of claim 1, wherein the interfering frequency indication information comprises the MO of the interfering frequency, and wherein the interfering frequency indication information further comprises first type indication information that indicates the type of the interfering frequency.

3. The IDC indication message sending method of claim 1, wherein the IDC indication message further comprises first power indication information that comprises at least one of a first transmit power of the interfering frequency, a first power difference of the interfering frequency, a first interference level of the interfering frequency, or a power headroom report (PHR) of the interfering frequency, wherein the first transmit power is a maximum transmit power of the terminal device, and wherein the first power difference of the interfering frequency is a difference between a current transmit power of the terminal device and the first transmit power.

4. The IDC indication message sending method of claim 1, wherein the IDC indication message further comprises second power indication information that comprises at least one of a second transmit power of the interfering frequency, a second power difference of the interfering frequency, or a second interference level of the interfering frequency, wherein the second transmit power is a minimum transmit power of the network device, and wherein the second power difference is a difference between a current transmit power of the network device and the second transmit power.

5. The IDC indication message sending method of claim 1, wherein the IDC indication message further comprises manner indication information that comprises first manner information or second manner information, wherein the first manner information indicates that the terminal device expects the network device not to send data temporarily, and wherein the second manner information indicates that the terminal device expects the network device to use a frequency division multiplexing manner.

6. The IDC indication message sending method of claim 1, further comprising:
   detecting that IDC interference exists in a frequency band supported by the terminal device; and
   sending the IDC indication message to the network device.

7. An in-device coexistence (IDC) indication message sending method implemented by a network device, wherein the IDC indication message sending method comprises:
   sending configuration information to a terminal device; and
   receiving an IDC indication message from the terminal device in response to the configuration information, wherein the IDC indication message comprises interfering frequency indication information or priority indication information,
   wherein the interfering frequency indication information indicates supplementary uplink (SUL) frequency information or a type of an interfering frequency,
   wherein the interfering frequency indication information comprises a measurement object (MO) of the interfering frequency or the SUL frequency information of the interfering frequency,
   wherein the priority indication information indicates a priority of a frequency band in which the interfering frequency is located,
   wherein the priority indication information comprises second type indication information, and
   wherein the second type indication information indicates a type of the frequency band.

8. The IDC indication message sending method of claim 7, wherein the interfering frequency indication information comprises the MO of the interfering frequency, and wherein the interfering frequency indication information further comprises first type indication information that indicates the type of the interfering frequency.

9. The IDC indication message sending method of claim 7, wherein the IDC indication message further comprises first power indication information that comprises at least one of a first transmit power of the interfering frequency, a first power difference of the interfering frequency, a first interference level of the interfering frequency, or a power headroom report (PHR) of the interfering frequency, wherein the first transmit power of the interfering frequency is a maximum transmit power of the terminal device, and wherein the first power difference of the interfering frequency is a difference between a current transmit power of the terminal device and the first transmit power.

10. The IDC indication message sending method of claim 9, further comprising indicating the maximum transmit power based on the first power indication information.

11. The IDC indication message sending method of claim 7, wherein the IDC indication message further comprises second power indication information that comprises at least one of a second transmit power of the interfering frequency, a second power difference of the interfering frequency, or a second interference level of the interfering frequency, wherein the second transmit power of the interfering frequency is a minimum transmit power of the network device, and wherein the second power difference of the interfering frequency is a difference between a current transmit power of the network device and the second transmit power.

12. The IDC indication message sending method of claim 7, wherein the IDC indication message further comprises manner indication information that comprises first manner information or second manner information, wherein the first manner information indicates that the terminal device expects the network device not to send data temporarily, and wherein the second manner information indicates that the terminal device expects the network device to use a frequency division multiplexing manner.

13. The IDC indication message sending method of claim 7, wherein the IDC indication message is sent when IDC interference exists in a frequency band supported by the terminal device, the terminal device cannot resolve the IDC interference, and the configuration information indicates that the terminal device can send the IDC indication message.

14. The IDC indication message sending method of claim 7, wherein the method further comprises determining an IDC interference cancellation manner based on the IDC indication message.

15. The IDC indication message sending method of claim 1, wherein the IDC indication message further comprises first power indication information, second power indication information, or manner indication information, wherein the first power indication information indicates a transmit power of the terminal device, wherein the second power indication information indicates a transmit power of the network device, and wherein the manner indication information indicates an IDC interference cancellation manner expected by the terminal device.

16. The IDC indication message sending method of claim 7, wherein the IDC indication message further comprises first power indication information, second power indication information, or manner indication information, wherein the first power indication information indicates a transmit power of the terminal device, wherein the second power indication information indicates a transmit power of the network device, and wherein the manner indication information is used to indicate an IDC interference cancellation manner expected by the terminal device.

17. A terminal device, comprising:
   at least one memory configured to store a computer program; and
   at least one processor coupled to the at least one memory and configured to execute the computer program to cause the terminal device to:
      receive configuration information from a network device; and
      send, when the configuration information indicates that the terminal device can send an in-device coexistence (IDC) indication message, the IDC indication message to the network device,
      wherein the IDC indication message comprises interfering frequency indication information or priority indication information,
      wherein the interfering frequency indication information indicates supplementary uplink (SUL) frequency information or a type of an interfering frequency,
      wherein the interfering frequency indication information comprises a measurement object (MO) of the interfering frequency or the SUL frequency information of the interfering frequency, wherein the priority indication information indicates a priority of a frequency band in which the interfering frequency is located, and wherein the priority indication information comprises second type indication information that indicates a type of the frequency band.

18. The terminal device of claim 17, wherein the IDC indication message further comprises first power indication information, second power indication information, or manner indication information, wherein the first power indication information indicates a transmit power of the terminal device, wherein the second power indication information indicates a transmit power of the network device, and wherein the manner indication information indicates an IDC interference cancellation manner expected by the terminal device.

19. The terminal device of claim 18, wherein the manner indication information comprises first manner information or second manner information, wherein the first manner information indicates that the terminal device expects the network device not to send data temporarily, and wherein the second manner information indicates that the terminal device expects the network device to use a frequency division multiplexing manner.

20. The terminal device of claim 17, wherein the interfering frequency indication information comprises the MO of the interfering frequency, and wherein the interfering frequency indication information further comprises first type indication information that indicates the type of the interfering frequency.

* * * * *